No. 696,117. Patented Mar. 25, 1902.
W. THOMSON.
APPARATUS FOR INDICATING AND RECORDING ELECTRIC PRESSURE AND CURRENT.
(Application filed Oct. 29, 1900.)
(No Model.) 2 Sheets—Sheet 1.
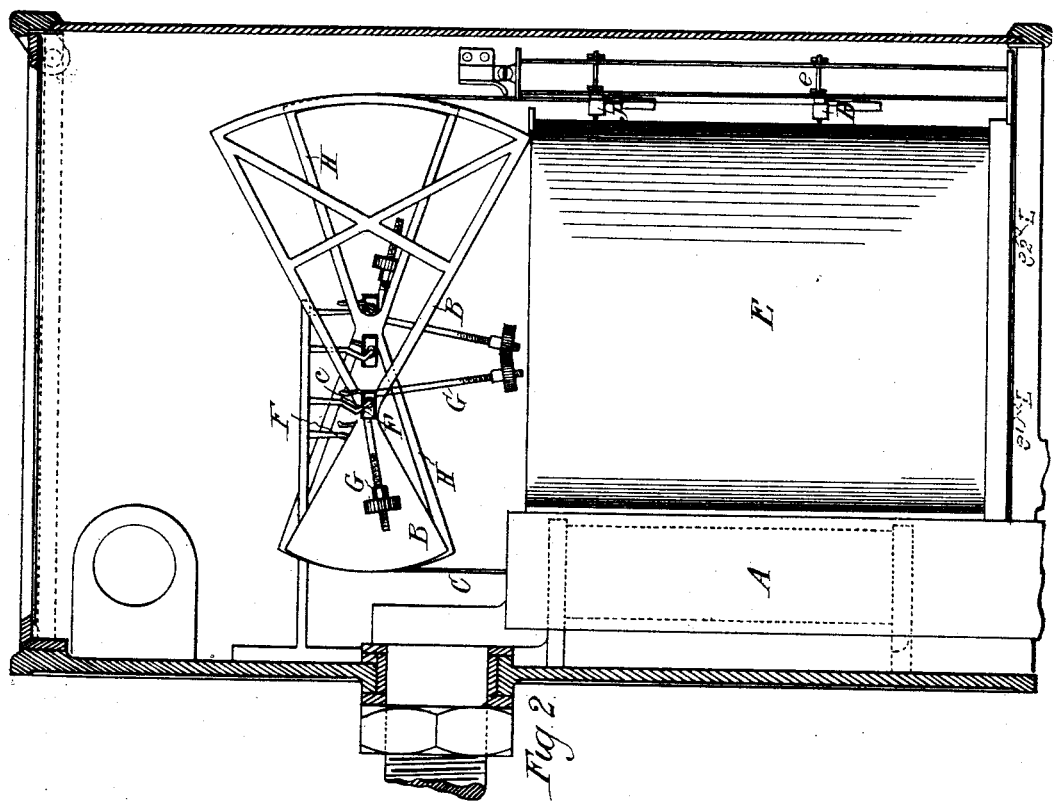
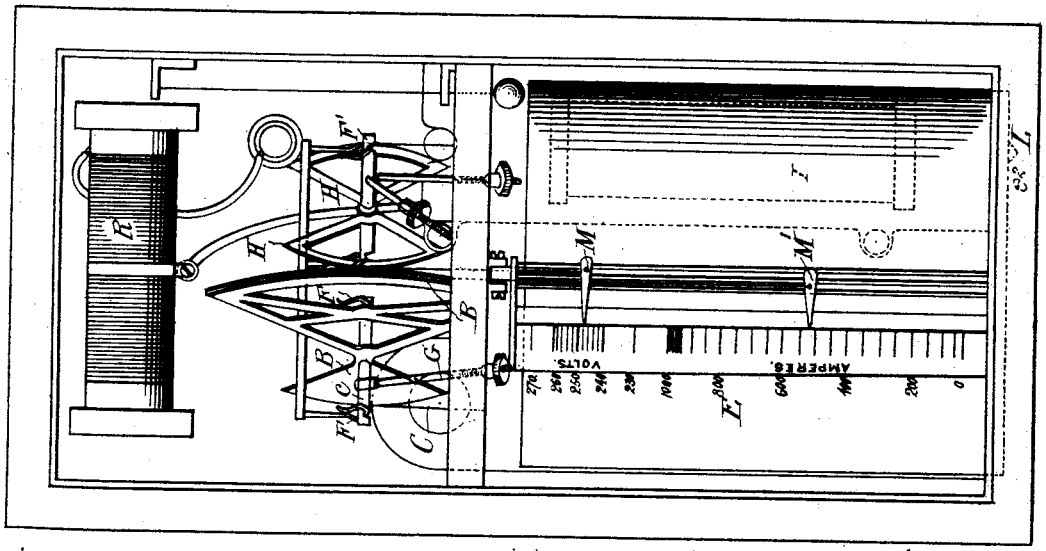

No. 696,117. Patented Mar. 25, 1902.
W. THOMSON.
APPARATUS FOR INDICATING AND RECORDING ELECTRIC PRESSURE AND CURRENT.
(Application filed Oct. 29, 1900.)
(No Model.) 2 Sheets—Sheet 2.

Witnesses.
Katharine M. Manning
Belle F. Stott

Inventor:
William Thomson
By Knight Bros.
Attys.

UNITED STATES PATENT OFFICE.

WILLIAM THOMSON, OF NETHERHALL, SCOTLAND.

APPARATUS FOR INDICATING AND RECORDING ELECTRIC PRESSURE AND CURRENT.

SPECIFICATION forming part of Letters Patent No. 696,117, dated March 25, 1902.

Application filed October 29, 1900. Serial No. 34,867. (No model.)

*To all whom it may concern:*

Be it known that I, WILLIAM THOMSON, (Baron Kelvin,) of Netherhall, Largs, in the county of Ayrshire, Scotland, (whose post-office address is Netherhall, Largs, in the county of Ayrshire, Scotland,) have invented new and useful Improvements in Apparatus for Indicating and Recording Electric Pressure and Current, of which the following is a specification.

This instrument is designed to record on a band of graduated paper the current passing from an electricity works or a distributing station and on the same paper the difference of potential either at the station, the feeding-point, or elsewhere.

Figure 4:
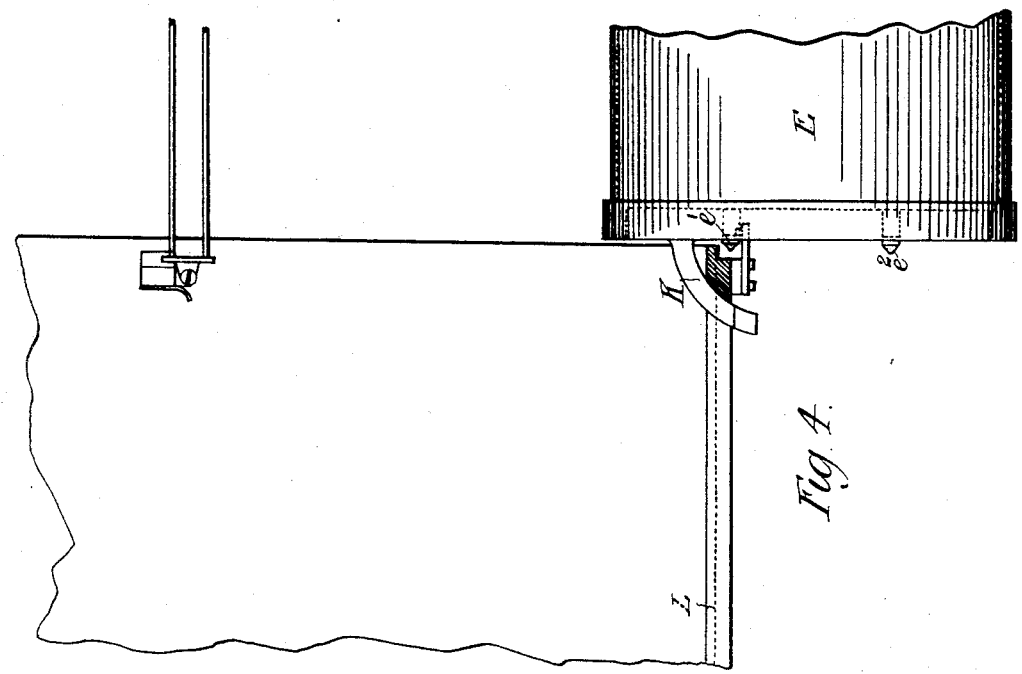
Figure 3:
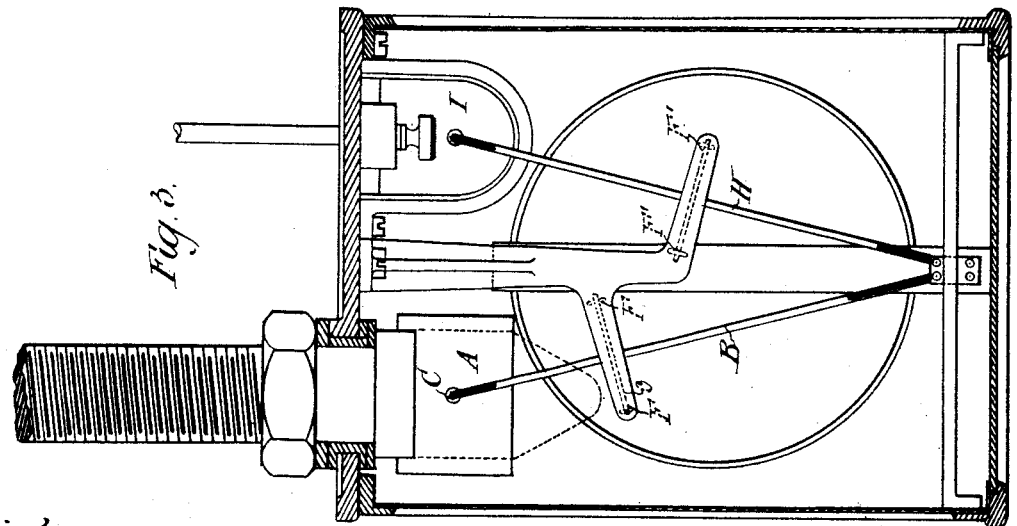

In the accompanying drawings, Figure 1 is a front view. Fig. 2 is a side view. Fig. 3 is a plan. Fig. 4 shows the drum in position for changing the paper.

The part of the apparatus for "current" consists of a solenoid A, into which a soft-iron plunger is entered. This solenoid is of suitable dimensions to take the main current. The soft-iron plunger is suspended from one side of a double sector B by a thread or fine wire C in the axis of this solenoid and entering into it. From the other side of the sector any form of pen D of sufficient size to hold a supply of ink is attached by means of a thread or fine wire. This pen bears against the record-paper, which is on a drum E, revolved by clockwork or other motor, and marks the value of the current passing on the graduted sheet. This pen has attached to it a horizontal bar $e$, working between guides, preventing it being carried around by the rotation of the drum. The bearing-axis $c$ of the double sector B is supported on hooks F or by pivots, so as to allow the sector freedom of motion around the axis. Controlling force and means of adjustment to scale are provided in the form of two screwed arms G at right angles to each other, with adjustable nuts attached to the bearing-axis of the double sector. Below the pen and directly in the line of suspension is also attached a weight, giving an extra means of adjustment and giving stability to the pen. The voltmeter is similarly arranged with plunger, double sector H, and controlling arrangements; but its solenoid I is one of fine wire, with many turns in circuit with a controlling resistance R. The pens D and J of the ampere-meter and voltmeter are preferably arranged to mark directly one above the other. For conveniently changing the paper the paper-drum E, with clock, is drawn out and turned downward, as shown in Fig. 4, and a tail K, with cross-piece on it, passing through a slot in the base of case, supports it, with the axis of the paper-drum, approximately horizontal when it is pulled out to its full extent. When in the working position, the drum is supported on three feet, two of these, $e'$ $e^2$, Fig. 4, running in a V-slot L and one on a plane, forming a geometrical fitting. Pointers M M', Fig. 1, are also fitted to indicate on scales the current and difference of potential.

I claim—

1. In an electric recording instrument, the combination of a plurality of pivoted marker-supporters in the same horizontal plane, converging toward one another, causing them to be brought together at one of their sides, and a marking device secured to each of said sides of the pivoted marker-supporters.

2. In an electric recording instrument, the combination of a plurality of double sectors converging toward one another, causing them to be brought together at one of their sides, and a marking device secured to each of said sides of the sectors.

3. In an electric recording instrument, the combination with a record-receiving member, of a plurality of marker-supporters mounted above the record-receiving member and converging toward one another, causing them to be brought together at one of their sides, and a marking device secured to each of said sides of the marker-supporters.

4. In an electric recording instrument, the combination of two double sectors converging toward one another, causing them to be brought together at one of their sides and to be separated at their other sides, solenoids of different potential, a soft-iron core suspended in the respective solenoids from each of the separated sides of the sectors; and a pen suspended from each of the sides of the sectors which are together.

5. In an electric recording instrument, the combination of a recording-drum, two double sectors pivotally mounted above the drums and converging toward one another, causing them to be brought together at one of their sides and to be separated at their other sides; solenoids of different potential, a soft-iron core suspended in the respective solenoids from each of the separated sides of the sectors; and a pen suspended from each of the sides which are together.

6. In an electric recording instrument, the combination with a pivoted marker-supporter and a marker carried thereby, of an indicating-pointer also carried by said marker-supporter and moving therewith.

7. In an electric recording instrument, the combination of a marker-supporter, a marker, and a thread suspending the marker from the supporter; of an arm carried by the marker, and a guide in which the arm works.

8. In an electric recording instrument, the combination of a marker-supporter, a marker, and a thread suspending the marker from the supporter; of an arm carried by the marker, a guide in which the arm works, and an indicating-pointer carried by said arm.

9. In an electric recording instrument of the character described the combination with the double sectors of pens suspended from one side of the respective sectors vertically over each other and weights suspended from each pen.

10. In an electric measuring instrument the combination with a double sector, a solenoid, a soft-iron plunger suspended from one side of the sectors, in said solenoid, of a pen suspended from the other side of the same sector, a weight suspended from said pen, of another double sector, a solenoid of fine wire, a soft-iron plunger suspended therein from one side of the last-named sector, a pen suspended from the other side of the same sector vertically over the first-named pen, a weight suspended from said pen, and a controlling resistance R for the last-named solenoid.

In testimony whereof I affix my signature in presence of two witnesses.

WILLIAM THOMSON.

Witnesses:
 JOHN SIDDLE,
 EDITH MARY EDMONDSTONE.